UNITED STATES PATENT OFFICE.

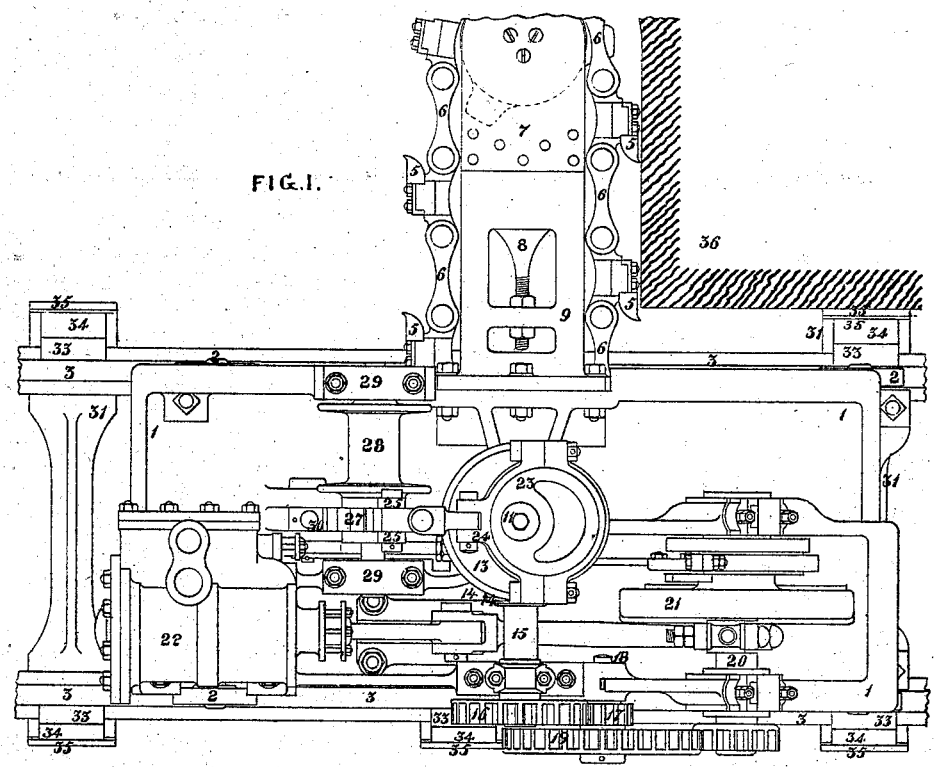

JOHN ALEXANDER, OF GARTSHERRIE, SCOTLAND.

IMPROVEMENT IN COAL-MINING MACHINERY.

Specification forming part of Letters Patent No. 135,874, dated February 18, 1873.

*To all whom it may concern:*

Be it known that I, JOHN ALEXANDER, of Gartsherrie, county of Lanark, Scotland, have invented certain Improvements in Machinery for Cutting or Getting Coal or other Minerals, of which the following is a specification:

My invention relates to machinery of the kind in which cutters are carried on an endless chain, and of which the earliest example, so far as I am aware, is described in the specification of William Peace's British patent, dated 4th October, 1853, No. 2,262; and the object of my invention is, by arranging and combining together the various details of the machinery in an improved manner, to overcome the practical difficulties hitherto experienced with this kind of machinery, and to obtain a machine which is not only thoroughly efficient and convenient in use, but is at the same time adapted for rough usage, durable, and not liable to derangement. My invention consists in arranging and combining the parts of machinery for cutting or getting coal or other minerals in the improved manner shown in the accompanying drawing, and hereinafter particularly described.

Figure 1 is a plan of the machine, and Figs. 2 and 3 a side elevation and a front-end elevation.

The working parts are carried on a cast-iron frame, 1, of a rectangular form in plan, and running on four wheels, 2, which rest on a pair of rails, 3, and are by preference quite plain or unflanged, displacement from the rails being prevented by pins or lugs 4 fixed to the frame 1, and projecting down beside the rails 3. The cutting of the mineral is effected by cutters 5 on an endless chain, 6, distended by a gib, 7, projecting out horizontally from one side of the frame 1, and carrying a toothed wheel between cheeks at its outer end. The outer part of the gib 7 is made adjustable, being formed with a shank, 8, which is screwed to receive adjusting-nuts on each side of a cross-bar formed on the inner fixed part 9 of the gib. The toothed wheel 10, by which the endless chain 6 is moved, is beneath the frame 1, and fast on a vertical shaft, 11, passing up through a tubular support, 12, formed or fixed on the frame 1. An inverted bevel-wheel, 13, on the upper part of the vertical shaft 11, is driven by a bevel-pinion, 14, on a horizontal shaft, 15, on which there is a spur-wheel, 16, driven by a pinion, 17, running on a stud, 18. The pinion 17 on the stud 18 is formed with or fixed to a spur-wheel, 19, which is driven by a pinion on a horizontal crank-shaft, 20, carried in bearings formed for it in the forward part of the frame 1. This crank-shaft 20 has fast on it a fly-wheel, 21, and is actuated in the ordinary way by means of a horizontal cylinder, 22, bolted down on the rear part of the frame 1, and worked by compressed air or other fluid. The vertical shaft 11 has fixed at its upper end an eccentric, 23, (or it might have a crank fixed or formed on it instead,) the strap 24 of which is connected to a pair of levers, 25, arranged with a pawl, 26, to act on a ratchet-wheel, 27, fixed to a barrel, 28, on which a chain or rope is wound. The journals of the barrel 28 turn in bearing-blocks 29 bolted upon the frame 1, and the levers 25 are centered loosely on one of the journals, while a retaining-pawl, 30, prevents the barrel from slipping back. The chain or rope which is wound on the barrel 28 is passed round a pulley held at a fixed point ahead of the machine, and the end of the chain or rope is returned and fixed to the frame 1, so that the barrel acts with a double purchase, and by winding up the chain or rope produces the requisite progressive movement of the machine along the rails. The rails 3, which are by preference of malleable cast-iron, are laid upon transverse malleable cast-iron sleepers 31, which are contrived to connect the lengths of rail and keep them to the proper gage. For this purpose the rail-lengths 3 are formed with sockets at their ends to fit upon snugs 32 cast on the sleepers 31, there being a pair of the snugs at each end of each sleeper to receive the abutting ends of the rail-lengths. The rails 3 are held down on the sleepers 31 by keys 33 inserted between the rails and the jaws 34 cast on the sleepers. The sleepers 31 are also formed with flanges 35 at their ends, one of which is set up against the coal-face 36, while wedges, blocks, or other convenient holders are applied against the other end to secure the sleeper. With rails and sleepers combined in this way it is quite unnecessary to lay any great length in advance of the machine, as those over which the machine has passed can, with great facility, be lifted, carried forward, and laid in front.

Where the thinness of the seam of coal or other mineral makes it desirable the height of the machine can be reduced by a slight alteration in the disposition of the parts—namely, by elongating the frame and arranging the spur-gearing all in the same horizontal plane, to admit of which being done the crank-shaft may be substituted by a shaft with an overhung fly-wheel and crank-pin, the spur-gearing being arranged toward the inner side of the cylinder, and with the vertical shaft either inside or outside of it.

What I claim as my invention is—

1. The chain and barrel operated by a ratchet-wheel worked by an eccentric or crank on the vertical shaft which drives the endless chain for obtaining a progressive motion of the machine, substantially as and for the purposes herein set forth.

2. The plain or unflanged carrying-wheels, combined with the pins or lugs 4, which prevent the displacement of the machine from the rails, substantially as and for the purposes herein set forth.

3. The sleepers 31, arranged with their snugs 32, and the keys 33 and jaws 34, to firmly connect the ends of the rail-lengths 3 into sockets, in which last the snugs enter, substantially as and for the purposes herein set forth.

JOHN ALEXANDER.

Witnesses:
 EDMUND HUNT,
 JOHN JENKINS.